May 1, 1923.

A. HOLMQUIST

FILLING MACHINE

Filed Jan. 3, 1921

Inventor:
August Holmquist
By Jones, Addington, Ames & Seibold
Attys.

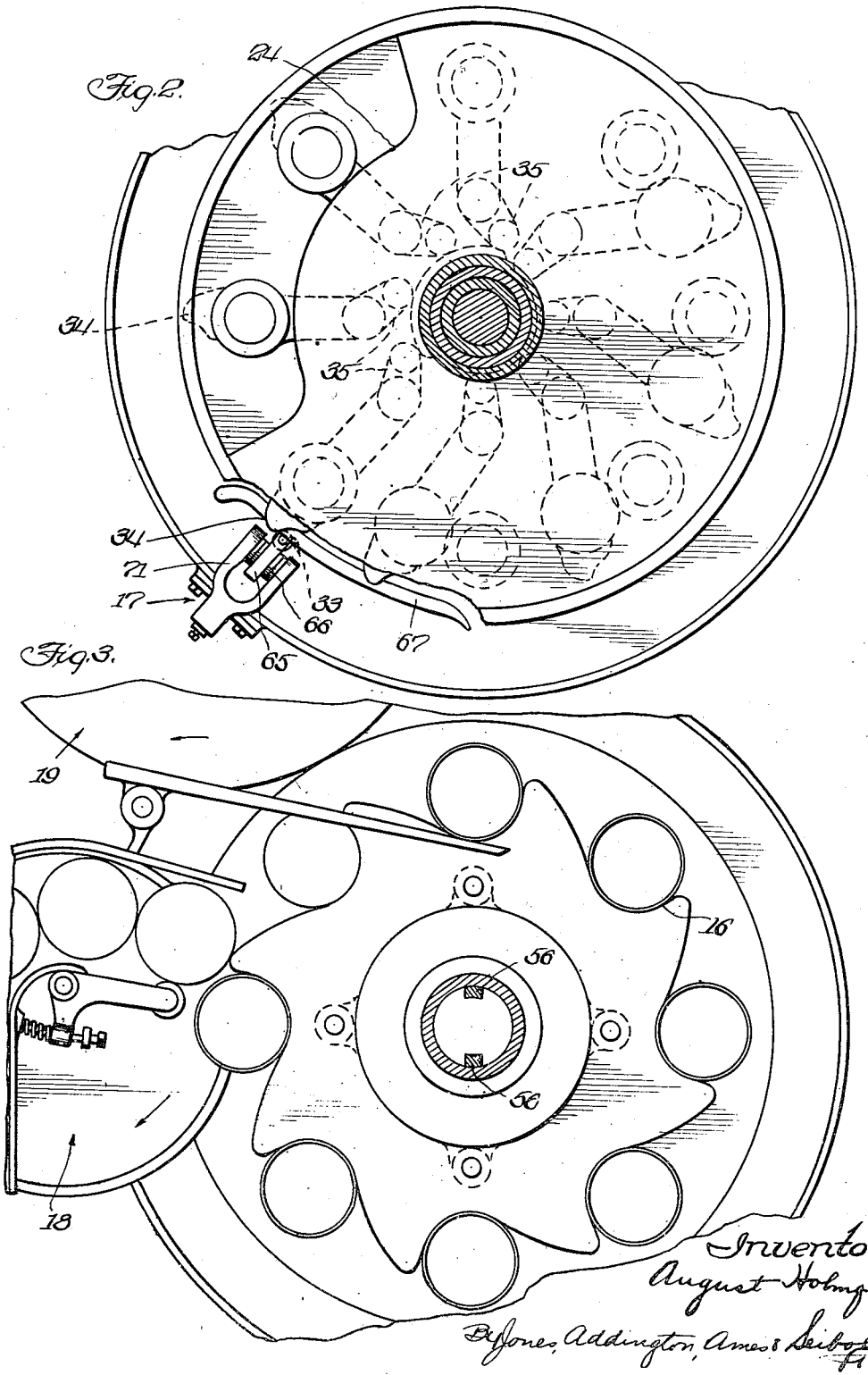

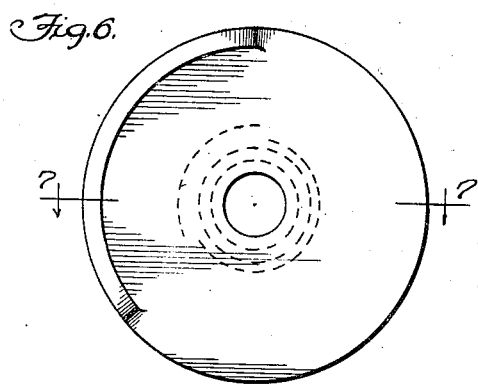
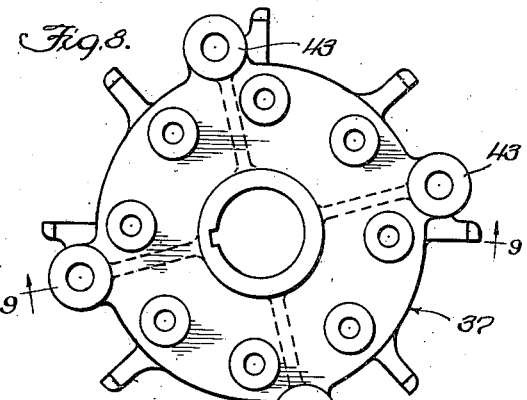
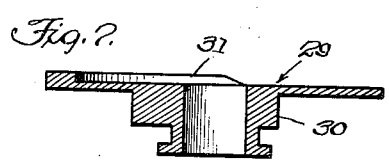
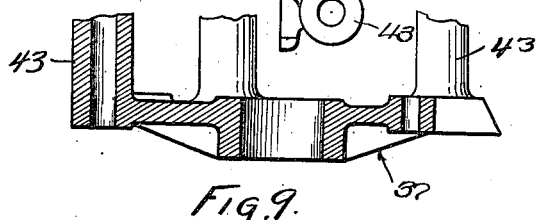
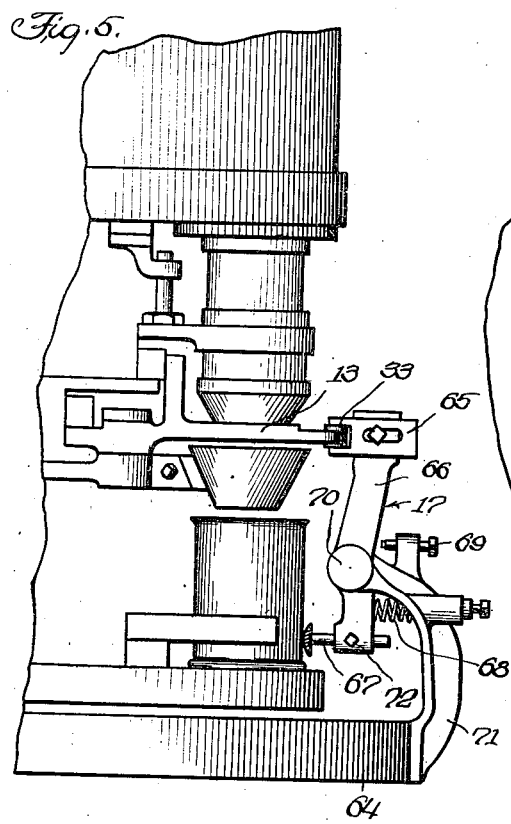
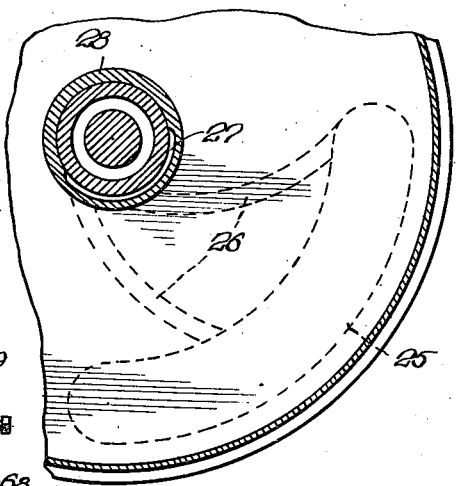

Patented May 1, 1923.

1,453,840

UNITED STATES PATENT OFFICE.

AUGUST HOLMQUIST, OF HOOPESTON, ILLINOIS, ASSIGNOR TO SPRAGUE CANNING MACHINERY COMPANY, OF CHICAGO, ILLINOIS, A CORPORATION OF ILLINOIS.

FILLING MACHINE.

Application filed January 3, 1921. Serial No. 434,441.

*To all whom it may concern:*

Be it known that I, AUGUST HOLMQUIST, a citizen of the United States, residing at Hoopeston, in the county of Vermilion and State of Illinois, have invented new and useful Improvements in Filling Machines, of which the following is a full, clear, concise, and exact description, reference being had to the accompanying drawing, forming a part of this specification.

My invention relates to filling machines, and more particularly to filling machines for filling granular, semi-liquid or liquid materials into cans.

One of the objects of my invention is to provide such a filling machine which will be efficient in operation, durable and compact in construction and cheap to manufacture.

Further objects will appear from the detailed description to follow and from the appended claims.

In the drawings in which an embodiment of my invention is shown—

Fig. 2 is a horizontal section on line 2—2 of Fig. 1 showing the valve action;

Fig. 3 is a horizontal section on the line 3—3 of Fig. 1 showing the can feed;

Fig. 4 is a section on the line 4—4 of Fig. 1 showing the vacuum release vent;

Fig. 5 is a fragmentary elevational view showing the no-can no-fill construction;

Fig. 6 is a plan view of the valve controlling cam;

Fig. 7 is a section on the line 7—7 of Fig. 6;

Fig. 8 is a plan view of the valve supporting member; and

Fig. 9 is a section on the line 9—9 of Fig. 8.

Figure 1:
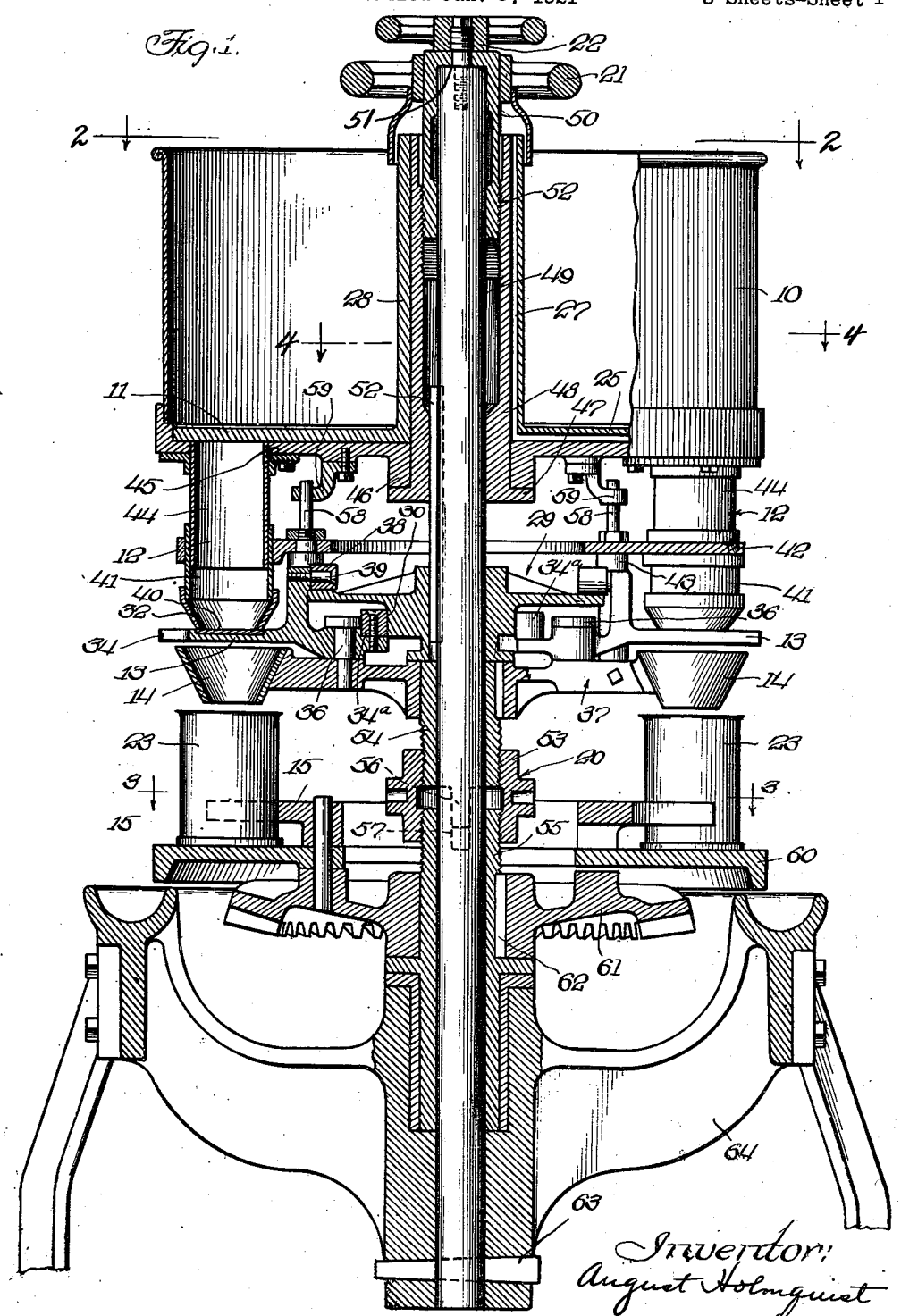
Fig. 1 is a vertical axial section of the filling machine.

While, as stated above, applicant's invention is applicable to machines for filling granular, semi-liquid and liquid materials, the particular embodiment of the invention shown was designed for filling sweet corn into cans. This cooked corn is semi-liquid, being mixed with a considerable quantity of syrup so that it flows readily and does not require to be forced from the reservoir into the cans.

The construction shown comprises a rotatable main tank 10 in which the material to be filled is placed, an aperture stationary cut-off plate inside of and at the bottom of the tank 10, a circular series of telescoping measuring pockets 12 secured to the rotatable tank 10 to rotate therewith underneath the stationary cut-off plate 11, a circular series of oscillatable valves 13, one for each of the measuring pockets 12 for controlling the discharge from said measuring pockets, a circular series of funnel members 14, one underneath each of the measuring pockets 12 for directing the discharged material into the cans, and a rotatable turret or can sweep 15 having a circular series of pockets 16, one for each of the measuring pockets 12 for causing the cans to travel along with and underneath the measuring pockets 12. There is also provided a no-can no-fill construction 17 (Figs. 2 and 5) whereby, if it happens that a can should not be supplied to one of the pockets 16, no material will be discharged from the corresponding measuring pocket, thus preventing material from being wasted and being splashed all over the machine.

Suitable can supply means 18 for feeding the cans to the pockets 16, and suitable can discharge means 19 for receiving the cans from the pockets 16, are provided, no claim being made to any novelty in the can feeding means 18 and the can discharge means 19 per se in this application.

For raising and lowering the lower sections of the measuring cups 12 and the funnels 14 for adjustment for different sizes of cans, a turnbuckle construction 20 (Fig. 1) is provided. For adjusting the capacity of the measuring cups 12 a hand-wheel 21 (Fig 1) is provided, a lock nut 22 being provided for holding the hand-wheel 21 in adjusted position. Turning the hand-wheel 21 raises or lowers the upper sections of the cups 12, together with the tank 10 and changes the capacity of these cups.

Before describing the construction in further detail, it is thought that a brief outline of the operation may make the construction easier to understand. As indicated above the plate 11, which is inside the tank 10 and which forms the bottom on which the material in the rotatable tank 10 rests, is stationary, and the measuring pockets 12 revolve underneath this stationary cut-off plate 11 along with the rotatable tank 10. The sweep 15 moves the cans 23 along with the measuring cups 12 and funnels 14, so that a can will always be underneath one of the funnels 14 when material is being discharged from the funnels.

As the telescoping measuring chambers 12 pass underneath the arcuate discharge opening 24, (Fig. 2) in the stationary cut-off plate 11, the material, such as cooked corn in the tank 10 drops down into these measuring pockets 12, filling them completely. The valves 13 are in closing position underneath the measuring pockets 12 when the measuring cups are being filled. As the pockets continue to travel, they travel from underneath the opening 24, the material in the pockets being measured off evenly by means of the stationary cut-off plate 11. As the measuring pockets 12 continue to revolve the swinging gate valves 13 are opened, by means to be described in detail hereinafter, and are swung out from underneath the measuring pockets 12 to permit the contents of the pockets to drop down into the funnels 14 and cans 23 underneath. If no can is in position underneath one of the measuring pockets 12, the gate valve 13 will not operate, but will remain in closing position, so that the material in the pockets will not be discharged, the construction whereby this is accomplished being described in detail hereinafter.

As the pockets continue to revolve, and after they have deposited their contents in the cans 23, means are provided for again closing the gate valves 13 before the measuring pockets pass again underneath the opening 24 in the stationary cut-off plate.

An important feature of my invention is the means which I have provided for "breaking the vacuum" underneath the stationary cut-off plate 11, or rather for admitting air underneath this stationary cut-off plate and above the material in the measuring pockets 12 so that the material in these pockets will be free to drop down into the cans as soon as the swinging gate valves 13 are moved to open position. To provide for this "breaking of the vacuum" the under side of the stationary plate 11 is provided with a shallow arcuate air chamber 25 (Figs. 1 and 4) which is in communication with the atmosphere through a pair of horizontal spirally extending passages 26 in the under face of the stationary cut-off plate 11, and through an upwardly extending air passage 27 formed in the inside of the sleeve 28, which extends upwardly and is formed integral with the stationary cut-off plate 11. As the measuring pockets 12 pass underneath that part of the stationary cut-off plate 11, which has this air relief chamber 25, the swinging gate valves 13 are opened, and as air is freely supplied to this air relief chamber through the passages 26 and 27, the material in the pockets 12 is free to drop down into the cans underneath.

The means for controlling the swinging gate valves 13 are so constructed, that not only are the gate valves swung laterally to open and closed position, but they are also forced snugly into sealing engagement with the lower edge of the measuring pockets 12 when they are brought into closed position. The movement of these swinging gate valves 13 to closed position is accomplished by means of a double cam member 29 (Fig. 7) having a peripheral cam edge 30 which controls the lateral swinging movement of the gate valve and having an upper face cam portion 31 which controls the sealing engagement of the gate valve with the lower edge 32 of the measuring pocket 12. It should be stated that the peripheral cam portion 30 controls merely the laterally swinging of the valves to closed position, the opening movement of the swinging valves being accomplished by the no-can no-fill attachment 17, which carries a movable abutment roller 33, which is movable into or out of cooperative relation with respect to the outwardly extending fingers 34 (Figs. 1 and 2) on the swinging gate valves 13. The closing of the gate valves by the peripheral cam portion 30 is effected by the engagement with this peripheral cam portion of rollers 34$^a$, mounted on inwardly extending fingers 35 on the swinging gate valves 34. These swinging gate valves are pivotally mounted on pivot pins 36, which pins in turn are carried by the spider member 37 (Figs. 8 and 9) on which the funnels 14 are mounted.

The sealing engagement between the gate valves 13 and the lower edge 32 of the measuring pockets 12 is effected by the engagement of the rollers or cam followers 38 with the face cam portion 31, these followers 38 being mounted on pins 39 carried by the swinging gate valves 13. The arrangement is such that after the valve 13 has been swung into position underneath the measuring pockets 12 by means of the peripheral cam portion 30, the face cam 31 will force the valve upward, to bring the swinging valve snugly into engagement with the lower edge 32 of the measuring cups. If desired, a rubber sealing pad may be provided on the upper face of the swinging gate valve, as indicated at 40.

The lower sections 41 of the measuring cups 12 are carried by a spider member 42, which spider member in turn is supported on four posts 43, which extend upwardly from the lower funnel-carrying spider 37 and are formed integral therewith.

The upper sections 44 of the telescoping cups 12 are carried by the bottom plate 45 of the rotatable tank 10. This bottom plate 45 in turn is supported by having its central hub portion 46 rest on a horizontal annular flange 47 on a sleeve 48 (Fig. 1) which sleeve 48 is in turn adjustably supported on the central upright post or shaft 49.

The adjustment of this supporting sleeve 48 is effected by means of the hand-wheel 21, which is secured to a supporting sleeve 50, the upper end of which bears on the upper end of the post 49 at 51, and the lower end of which sleeve has a threaded engagement at 52 with the vertically adjustable supporting sleeve 48. By turning the hand-wheel 21 the supporting sleeve 48 is moved up or down and with it the rotatable tank 10 and the upper sections 44 of the measuring cups 12, whereby the capacity of these measuring cups 12 may be adjusted. In order to lock the adjustment sleeve 50 in position, the lock nut 22 may be tightened down to clamp the upper end of the supporting sleeve 50 against the upper end of the shaft 49 as indicated at 51. In order to prevent the supporting sleeve 48 from being rotated along with the rotatable tank 10, the sleeve 48 is splined on the upright post or shaft 49 as indicated at 52. This spline 52 also serves to hold the cam member 29 against rotation, as shown in Fig. 1.

As indicated in a general way heretofore, the lower sections 41 of the telescoping cups, together with the funnel members 14 are adjusted vertically for different size cans by means of the turnbuckle construction 20.

Referring more in detail to this vertical adjustment for different size cans, the turnbuckle nut 53 acts to raise or lower the upper sleeve 54 with respect to the lower sleeve 55. This upper sleeve 54 which is raised or lowered carries the spider 37 which in turn carries the upper spider member 42, which carries the lower section 41 of the telescoping cup 12. The lower spider 37 also carries the oscillatable valve 13 and funnels 14, so that if the sleeve 54 is raised or lowered it carries with it the lower section 41 of the measuring cup 12 together with the valve mechanism which controls the discharge from the measuring cup and the funnels which direct the discharge into the cans. This raising and lowering enables an adjustment to be made for different sizes of cans.

In order to effect a driving connection between the upper sleeve member 54 and the lower sleeve member 55 in the various adjusted positions, the upper sleeve member 54 is provided with a pair of tongues 56 (Figs. 1 and 3) which extend downward into threaded engagement with notches 57 in the upper edge of the lower sleeve 55, so that the lower sleeve 55 will drive the upper sleeve 54 regardless of the vertical adjustment of the upper sleeve 54. The upper sleeve 54 as it revolves carries with it the spiders 37 and 42, and the lower section 41 of the measuring cup 12. The lower sections 41 would drive the upper sections 44 with them but in order to relieve the strain on the cups I provide an additional driving connection for the upper sections 44 of the cups and the rotatable tank 10, this driving connection comprising a plurality of pins 58 extending upwardly from the spider 42 and having a feathered driving engagement with the lugs 59 secured to the bottom of the tank 10. This sliding or feathered connection between the pins 58 and the lugs 59 permit of a relative vertical adjustment between the upper and lower sections 44 and 41 of the measuring cup 12, without interfering with the driving relation.

The cam sweep 15 and the rotatable table 60 on which the cans 23 rest are mounted to rotate with the bevel gear 61, which gear 61 is keyed at 62 to the lower sleeve 55. This gear 61 drives the entire rotary construction of the machine including the can table 60, the can sweep 15, the measuring cups 12, the tank 10, and the valves 13 which control the discharge from the cups 12.

The central post 49 which supports the stationary cut-off plate 11 and the stationary cam 29 is secured at its lower end by means of a key 63 to the main supporting frame 64.

Referring more in detail to the no-can no-fill construction 17, this comprises in addition to the roller abutment 33, which controls the opening of the valves 13 (Figs. 3 and 5) a bearing yoke or bracket 65 in which the roller 33 is mounted, and a lever 66 on which the bearing bracket 65 is mounted, the lower end of this lever 66 being provided with an adjustable can engaging member or finger 67, whereby when the can is in position it engages the member 67 and thus swings the lever 66 carrying the abutment roller 33 over into the path of the finger 34 which extends outwardly from the valve 13. In order that the roller 33 may be moved out of the path of the finger 34 if no can is in position, a coil compression spring 68 is provided which acts on the lower end of the lever 66 to force the lower end inwardly and the upper end outwardly, to withdraw the abutment roller 33. To limit the distance to which the abutment roller 33 may be withdrawn an adjustable stop or set screw 69 is provided which engages the outer edge of the lever 66 to limit its movement under the action of the spring 68. The lever 66 is pivotally mounted at 70 in a lever bracket 71 mounted on the base or frame 64. In order to adjust the no-can no-fill attachment for different sizes of cans the can engaging member 67 is made adjustable inwardly and outwardly on the lower end of the lever 66, and may be secured in its various positions of adjustment by means of a set screw 72.

The purpose of making the can engaging finger 67 so long is so that the no-can no-fill mechanism can remain in one position without working back and forth so long as the cans are regularly supplied. If it were not long enough so as to stay in engagement with one can until the next one came along it would be constantly working back and forth without accomplishing any useful result.

What I claim as new and desire to secure by Letters Patent of the United States is:

1. A can filling machine comprising a rotatable tank, a stationary cut-off plate in said tank, a series of measuring pockets rotatable with said tank, and supplied with material from said tank, said stationary cut-off plate serving to cut off the supply of material from said tank to said pockets, and a plurality of laterally swinging gate valves, one for each of said measuring pockets, for controlling the discharge from said measuring pockets, and means for intermittently forcing said laterally swinging gate valves upwardly into sealing engagement with the outlet from said measuring cups as said measuring cups are being filled from said rotatable tank.

2. A can filling machine comprising a rotatable tank, a stationary cut-off plate in said tank, a series of measuring pockets rotatable with said tank, and supplied with material from said tank, said stationary cut-off plate serving to cut off the supply of material from said tank to said pockets, and a plurality of laterally swinging gate valves, one for each of said measuring pockets, for controlling the discharge from said measuring pockets, and means for forcing said laterally swinging gate valves upwardly into sealing engagement with the outlet from said measuring cups as said measuring cups are being filled from said rotatable tank, said means comprising a stationary cam, and a follower on each of said valves for engaging said cam.

3. A can filling machine comprising a rotatable tank, a stationary cut-off plate in said tank, a series of measuring pockets rotatable with said tank, and supplied with material from said tank, said stationary cut-off plate serving to cut off the supply of material from said tank to said pockets, a plurality of laterally swinging gate valves, one for each of the measuring pockets for controlling the discharge from the measuring pockets, and cam means for controlling the lateral swinging of said gate valves and for forcing said gate valves upwardly into sealing engagement with the outlet from the measuring cups as the measuring cups are being filled from the rotatable tank.

4. A can filling machine comprising a rotatable tank, a stationary cut-off plate in said tank, a central sleeve extending upwardly from said stationary plate, a plurality of measuring pockets rotatable with said tank, and supplied with material from said tank, said cut-off plate serving to cut off the supply of material from said tank to said pockets, means whereby the material in said pockets is discharged into the cans by gravity, and means for admitting air underneath said cut-off plate when the pockets are discharging, comprising an air chamber in the lower face of said cut-off plate, and an air passage in said sleeve leading downwardly to said arm chamber.

In witness whereof, I have hereunto subscribed my name.

AUGUST HOLMQUIST.